US009133968B2

(12) United States Patent
Elrick et al.

(10) Patent No.: US 9,133,968 B2
(45) Date of Patent: Sep. 15, 2015

(54) TUBING SECTION COUPLING

(75) Inventors: Andrew John Elrick, Aberdeen (GB); Steven Reid, Aberdeen (GB)

(73) Assignee: Petrowell Limited, Aberdeen (GB)

( * ) Notice: Subject to any disclaimer, the term of this patent is extended or adjusted under 35 U.S.C. 154(b) by 20 days.

(21) Appl. No.: 12/933,015

(22) PCT Filed: Mar. 23, 2009

(86) PCT No.: PCT/GB2009/000770
§ 371 (c)(1),
(2), (4) Date: Dec. 27, 2010

(87) PCT Pub. No.: WO2009/122133
PCT Pub. Date: Oct. 8, 2009

(65) Prior Publication Data
US 2011/0127768 A1 Jun. 2, 2011

(30) Foreign Application Priority Data

Mar. 29, 2008 (GB) .................................. 0805719.2

(51) Int. Cl.
*F16L 25/00* (2006.01)
*F16L 19/02* (2006.01)
*E21B 17/046* (2006.01)
*F16L 19/025* (2006.01)

(52) U.S. Cl.
CPC ........... *F16L 19/0225* (2013.01); *E21B 17/046* (2013.01); *F16L 19/025* (2013.01); *Y10T 29/49947* (2015.01)

(58) Field of Classification Search
USPC ........... 285/333, 332, 332.1, 334.4, 913, 914, 285/330
See application file for complete search history.

(56) References Cited

U.S. PATENT DOCUMENTS

| 579,643 | A | * | 3/1897 | Gleason | .................. 285/330 |
| 643,358 | A | | 2/1900 | Konold | |
| 1,253,149 | A | * | 1/1918 | Childers | .................. 285/114 |
| 1,589,781 | A | * | 6/1926 | Anderson | .................. 285/330 |
| 1,781,091 | A | * | 11/1930 | Wilson | .................. 285/148.19 |
| 2,009,322 | A | | 7/1935 | Emil | |
| 2,181,748 | A | | 11/1939 | Thaheld | |

(Continued)

FOREIGN PATENT DOCUMENTS

DE 3812211 11/1989
DE 19827708 1/1999

(Continued)

OTHER PUBLICATIONS

International Search Report for PCT/GB2009/000730, Sep. 24, 2009.

(Continued)

*Primary Examiner* — Aaron Dunwoody
(74) *Attorney, Agent, or Firm* — Blank Rome LLP

(57) ABSTRACT

A tubing section coupling comprises a first tubular portion and a second tubular portion (18,20) having an external surface adapted to slidingly engage an internal surface defined by the first tubular portion. The first and second tubular portions (18, 20) are axially restrained by means of a fixing device adapted to releasably connect the first and second tubular portions together. The first and second tubular portions (18, 20) each define a profile; the profiles are adapted to be connected to rotationally restrain the tubular portions.

29 Claims, 3 Drawing Sheets

(56) References Cited

U.S. PATENT DOCUMENTS

| | | | |
|---|---|---|---|
| 2,273,017 A | 2/1942 | Boynton | |
| 2,498,791 A | 2/1950 | Clark | |
| 2,546,377 A | 3/1951 | Turechek | |
| 2,708,132 A * | 5/1955 | O'Neill | 403/320 |
| 2,738,018 A | 3/1956 | Lynes | |
| 2,832,418 A | 4/1958 | Baker | |
| 3,066,738 A | 12/1962 | Myers | |
| 3,087,552 A | 4/1963 | Graham | |
| 3,167,127 A | 1/1965 | Sizer | |
| 3,167,128 A | 1/1965 | Sutliff | |
| 3,283,821 A | 11/1966 | Brown | |
| 3,342,268 A | 9/1967 | Brown | |
| 3,356,142 A | 12/1967 | Crow et al. | |
| 3,371,716 A | 3/1968 | Current | |
| 3,392,783 A | 7/1968 | Reed | |
| 3,443,827 A | 5/1969 | Acker et al. | |
| 3,482,889 A | 12/1969 | Cochran | |
| 3,623,551 A | 11/1971 | Randermann | |
| 3,623,753 A * | 11/1971 | Henry | 285/330 |
| 3,722,588 A | 3/1973 | Tamplen | |
| 3,729,170 A | 4/1973 | Lewis | |
| 3,741,251 A * | 6/1973 | Rees | 138/96 R |
| 3,751,077 A | 8/1973 | Hiszpanski | |
| 3,854,760 A | 12/1974 | Duret | |
| 3,889,750 A | 6/1975 | Mullins | |
| 4,046,405 A | 9/1977 | Bonds | |
| 4,127,168 A | 11/1978 | Hanson | |
| 4,317,485 A | 3/1982 | Ross | |
| 4,331,315 A | 5/1982 | Geisow | |
| 4,346,919 A | 8/1982 | Morrill | |
| 4,375,240 A | 3/1983 | Baugh | |
| 4,512,596 A * | 4/1985 | Obrecht | 285/81 |
| 4,534,585 A | 8/1985 | Saliger | |
| 4,588,030 A | 5/1986 | Blizzard | |
| 4,655,479 A | 4/1987 | Farr, Jr. | |
| 4,669,538 A | 6/1987 | Szarka | |
| 4,709,758 A | 12/1987 | Preston, Jr. et al. | |
| 4,762,344 A | 8/1988 | Perkins et al. | |
| 4,917,187 A | 4/1990 | Burns | |
| 2,230,447 A | 2/1991 | Bassinger | |
| 5,048,871 A * | 9/1991 | Pfeiffer et al. | 285/39 |
| 5,058,684 A | 10/1991 | Winslow | |
| 5,095,978 A | 3/1992 | Akkerman | |
| 5,261,488 A | 11/1993 | Gullet | |
| 5,431,507 A * | 7/1995 | Smilanick | 403/307 |
| 5,474,334 A * | 12/1995 | Eppink | 285/184 |
| 5,494,320 A * | 2/1996 | Cerruti | 285/332 |
| 5,542,473 A | 8/1996 | Pringle | |
| 5,785,357 A * | 7/1998 | Foster et al. | 285/92 |
| 5,794,985 A | 8/1998 | Mallis | |
| 6,062,307 A | 5/2000 | Gosse | |
| 6,070,912 A | 6/2000 | Latham | |
| 6,116,658 A * | 9/2000 | Bohlen | 285/330 |
| 6,168,213 B1 * | 1/2001 | Muller | 285/391 |
| 6,315,041 B1 | 11/2001 | Carlisle | |
| 6,557,905 B2 * | 5/2003 | Mack et al. | 285/330 |
| 6,860,525 B2 * | 3/2005 | Parks | 285/391 |
| 6,908,121 B2 * | 6/2005 | Hirth et al. | 285/318 |
| 7,213,655 B2 * | 5/2007 | Parrott | 166/380 |
| 7,226,090 B2 * | 6/2007 | Hughes | 285/330 |
| 7,390,032 B2 * | 6/2008 | Hughes | 285/330 |
| 7,478,842 B2 * | 1/2009 | Reynolds et al. | 285/333 |
| 7,493,960 B2 * | 2/2009 | Leising et al. | 166/380 |
| 7,690,424 B2 | 4/2010 | McLeod | |
| 7,793,994 B2 * | 9/2010 | Boyd | 285/354 |
| 7,887,098 B2 * | 2/2011 | Aas | 285/92 |
| 2003/0000607 A1 | 1/2003 | Jenner | |
| 2003/0122373 A1 * | 7/2003 | Hirth et al. | 285/92 |
| 2003/0127857 A1 * | 7/2003 | Boyd et al. | 285/330 |
| 2004/0055757 A1 | 3/2004 | Beall | |
| 2004/0149435 A1 | 8/2004 | Henderson | |
| 2004/0207202 A1 * | 10/2004 | Parks | 285/391 |
| 2005/0022999 A1 * | 2/2005 | Hughes | 166/380 |
| 2005/0023831 A1 | 2/2005 | Hughes | |
| 2005/0224227 A1 | 10/2005 | Hendrie | |
| 2006/0060352 A1 | 3/2006 | Vidrine et al. | |
| 2006/0273586 A1 * | 12/2006 | Reynolds et al. | 285/390 |
| 2009/0308592 A1 | 12/2009 | Mercer | |

FOREIGN PATENT DOCUMENTS

| | | |
|---|---|---|
| EP | 0294088 | 12/1988 |
| EP | 0468668 | 1/1992 |
| EP | 0485080 | 5/1992 |
| EP | 1408195 | 4/2004 |
| GB | 755082 | 8/1956 |
| GB | 1257790 | 12/1971 |
| GB | 1364054 | 8/1974 |
| GB | 2118659 | 11/1983 |
| GB | 2224526 | 5/1990 |
| GB | 2245624 | 8/1992 |
| GB | 2328230 | 2/1999 |
| GB | WO2005121498 | 12/2005 |
| GB | WO 2006/046075 | 5/2006 |
| GB | 2428708 | 2/2007 |
| WO | 9949257 | 9/1999 |
| WO | WO02/42672 | 5/2002 |
| WO | WO 2005/026494 | 3/2005 |
| WO | WO 2007/109878 | 10/2007 |

OTHER PUBLICATIONS

Written Opinion for PCT/GB2009/000730, Sep. 18, 2010.
Office Action, Applicant's co-pending U.S. Appl. No. 11/909,820, Oct. 7, 2010.
International Search Report for PCT/GB2009/000770, Oct. 8, 2009.
Written Opinion for PCT/GB2009/000770, Sep. 29, 2010.
pct-gb2005-001391, Written Opinion, Jun. 23, 2005.
pct-gb2005-004200, Written Opinion, Apr. 10, 2006.
pct-gb2005-003871, Int'l Prelim. Report on Patentability, Sep. 11, 2007.
pct-gb2005-003871, International Search Report, Nov. 17, 2005.
Office Action dated Mar. 30, 2009, Applicant's co-pending U.S. Appl. No. 11/816,421.
Office Action dated Sep. 28, 2009, Applicant's co-pending U.S. Appl. No. 11/816,421.
pctgb2006001297, Int'l Prelim. Report on Patentability and Written Opinion, Oct. 9, 2007.
Office Action dated May 29, 2009, Applicant's co-pending U.S. Appl. No. 11/909,820.
Office Action dated Feb. 17, 2010, Applicant's co-pending U.S. Appl. No. 11/909,820.
pctgb2007001040, International Search Report, Jun. 5, 2010.
pctgb2007001040, Int'l Prelim. Report on Patentability and Written Opinion, Sep. 23, 2008.
pctgb2007004372, Int'l Prelim. Report on Patentability and Written Opinion, May 19, 2009.
pctgb2007004372, International Search Report, Jan. 23, 2008.
pctgb2008002042, Int'l Prelim. Report on Patentability and Written Opinion, Dec. 20, 2009.
pctgb2008002042, International Search Report, Oct. 17, 2008.
pct-gb2008003883, Int'l Prelim. Report on Patentability and Written Opinion, May 25, 2010.
pctgb2008003883, International Search Report, Mar. 26, 2009.
PCT-GB2005-001391, International Preliminary Report on Patentability, dated Jun. 23, 2005.
PCT-GB2005-001391, International Search Report, dated Jun. 23, 2005.
PCT-GB2005-004200, International Preliminary Report on Patentability, dated May 1, 2007.
PCT-GB2005-004200, International Search Report, dated Jan. 11, 2006.
Office Action for U.S. Appl. No. 11/816,421, dated Sep. 28, 2009.
PCT-GB2005-003871, Written Opinion, dated Nov. 22, 2005.
PCT-GB2006-001297, International Search Report, Oct. 9, 2007.
International Search Report in PCT Application PCT/GB2005/004200, dated Apr. 7, 2006.
Examination Report received in corresponding Australian application No. 2009232216, dated Aug. 8, 2014, 5 pages.

* cited by examiner

Detail A

TUBING SECTION COUPLING

FIELD OF THE INVENTION

The present invention relates to a tubing section coupling and particularly to an apparatus and method for connecting tubing section tubulars.

BACKGROUND OF THE INVENTION

Conventional tubing sections are assembled by screwing one length of tubular into the end of another length of tubular. The tubulars are normally connected one at a time and lowered down into the well. There may be situations in which it is not desirable to rotate one of the tubulars because, for example, electric cables or hydraulic lines are secured to the tubular, these cables or lines also being attached to equipment remaining on the rig. Rotation of this tubular could damage the cables or lines.

To overcome these drawbacks, "torque through quick connects" have been developed. In a quick connect, the lower external end of an upper tubular defines a tapered polished surface. This tapered polished surface is received by a complementary tapered polished surface defined by an internal surface of a lower tubular. Once the ends of the tubulars are engaged, the tubulars are secured by a collar which is restrained to the upper tubular and threadedly connected by rotation to an outer surface of the lower tubular.

Whilst this type of connection is relatively effective when subject to an axial force, a connection of this type may become unstable when exposed to a rotational force.

SUMMARY OF THE INVENTION

According to a first aspect of the present invention there is provided a tubing section coupling comprising;

a first tubular portion; and a second tubular portion having an external surface adapted to slidingly engage an internal surface defined by the first tubular portion, the first and second tubular portions being axially restrained by means of a fixing device adapted to releasably connect the first and second tubular portions together;

wherein the first and second tubular portions each define a profile, the profiles adapted to be connected to rotationally restrain the tubular portions.

In one embodiment of the present invention, the first and second tubular portions are both axially and rotationally restrained with respect to each other. Such an arrangement provides improved torsional stability for the tubing section coupling and shows that minimal rotation of the tubular portions is required to make an axially and rotationally restrained connection.

In one embodiment, the first and second tubular portion profiles are engaged directly to each other.

In a preferred embodiment, the first and second tubular portion profiles are indirectly connected to each other.

In this preferred embodiment, the tubular portion profiles are indirectly connected through a connecting element.

The connecting element may comprise metal.

The tubular portion profiles may be castellations. Castellated profiles can be used to provide a secure and reliable connection between the first and second tubular portions.

In an alternative embodiment the tubular portion profiles may be angled teeth.

In a still further alternative the tubular portion profiles may be an at least one key and an at least one associated keyway or any other suitable engagement profile.

Where a connecting element is used, the connecting element may have a first surface for engaging the first tubular portion profile and a second surface for engaging the second tubular portion profile.

Where a connecting element is used, the first and second tubular portion profiles may be non-complementary. In an arrangement where the tubular portion profiles are connected directly to each other, one or both of the tubular portions may have to be rotated to align the profiles. For example, where each profile is castellated with five castellations, a relative rotation of up to 36° may be required to align the tubular portion profiles. Having different first and second tubular portion profiles connected by a connecting element can reduce the relative rotation required to connect the tubular portions. For example, the first tubular portion profile may comprise five castellations and the second tubular portion profile may comprise seven castellations. Use of a connecting element with a first surface defining a profile complementary to the first tubular portion profile and a second surface defining a profile complementary to the second tubular portion profile, can reduce the amount of rotation which must be applied to one or other of the tubular portions to allow the profiles to be mated with the connecting element to rotationally restrain the tubulars. To connect the tubulars the connecting element is connected to, for example, the second tubular portion profile in the position which minimises the rotation necessary to the first tubular portion to connect the first tubular portion profile with the connecting element.

In an alternative example, the first tubular portion profile may be castellated and the second tubular portion profile may be toothed. In this example, the connecting element will have a castellated first surface complementary to the first tubular portion profile and a toothed second surface complementary to the second tubular portion profile. Such an arrangement has the further advantage of making it immediately apparent which way round the connecting element should be located.

Preferably, the coupling is arranged such that only one of the tubular portions need be rotated to be coupled to the other tubular portion.

Preferably, the tubular portion to be rotated has a profile comprising fewer castellations, recesses, teeth or the like than the profile of the other tubular portion. The greater the number of castellations, recesses, teeth or the like on the profile of the stationary tubular portion increases the number positions which the connecting element can be located on the stationary tubular. The greater the number of possible positions of the connecting element, the greater the chances of there being one in which the non-engaged connecting element surface is aligned, or is nearly aligned, with the tubular portion which can be rotated, minimising the amount of rotation necessary to couple the tubular portions together.

In an alternative embodiment both tubular portions can be rotated. This arrangement reduces the amount of rotation required for each tubular to connect the tubular portions.

At least one of the first and second tubular portion profiles may be defined by an end of the tubular portion.

At least one of the first and second tubular portion profiles may be defined by an external surface of the tubular portion.

At least one of the first and second tubular portion profiles may be defined by an internal surface of the tubular portion.

In one embodiment, the first tubular portion profile is defined by an end of the first tubular portion and the second tubular portion profile is defined by an external surface of the second tubular portion such that when the first and second tubular portions are fully engaged, the second tubular portion profile is adjacent the end of the first tubular portion.

Preferably, the fixing device is associated with one of the first and second tubular portions and adapted to be releasably connected to the other of the first and second tubular portions Preferably, the fixing device is releasably connected to the other of the first and second tubular portion by means of a threaded connection.

Preferably, the threaded connection engages an external surface of the other tubular portion.

Preferably, the fixing device is connected to the second tubular portion and engages a thread defined by an external surface of the first tubular portion.

The fixing device may be a collar.

Preferably, the fixing device is adapted to draw the tubular portions together to from a seal.

Preferably, the seal is a metal-to-metal seal.

Preferably, the second tubular portion defines a radially extending shoulder for restricting axial movement of the collar in at least one direction. The shoulder prevents the collar dropping off the end of the second tubular portion as the second tubular is lowered into engagement with the first tubular portion.

The shoulder may also define the second tubular portion profile.

One or both of the tubular portions may be releasably attached to one or more tubulars.

Alternatively, one or both tubular portions may be integral with a tubular.

According to a second aspect of the present invention, there is provided a method of coupling tubulars, the method comprising;

slidingly engaging an internal surface defined by a first tubular portion with an external surface defined by a second tubular portion;

axially restraining the first and second tubular portions together by releasably connecting a fixing device the first and second tubular portions; and rotationally restraining the first and second tubular portions by connecting a first tubular portion profile with a second tubular portion profile.

The rotationally restraining step may further comprise rotating one or other of the first and second tubular portions to connect the first tubular portion profile with the second tubular portion profile.

The method may further include the step of connecting the first tubular portion profile with the second tubular portion profile by means of a connecting element.

The method may further comprise the step of axially translating the fixing device with respect to one of the first and second tubular portions to releasably connect the collar to the other of the first and second tubular portions.

The method may further comprise the step of engaging a connecting element surface with one of the first or second tubular portion profiles before engaging the other of the first or second tubular portion profiles with another connecting element surface.

Preferably, the method further comprises the step of forming a metal-to-metal seal between the tubular portions.

BRIEF DESCRIPTION OF THE DRAWINGS

An embodiment of the present invention will now be described with reference to the accompanying drawings in which.

DETAILED DESCRIPTION OF THE DRAWINGS

Figure 1:
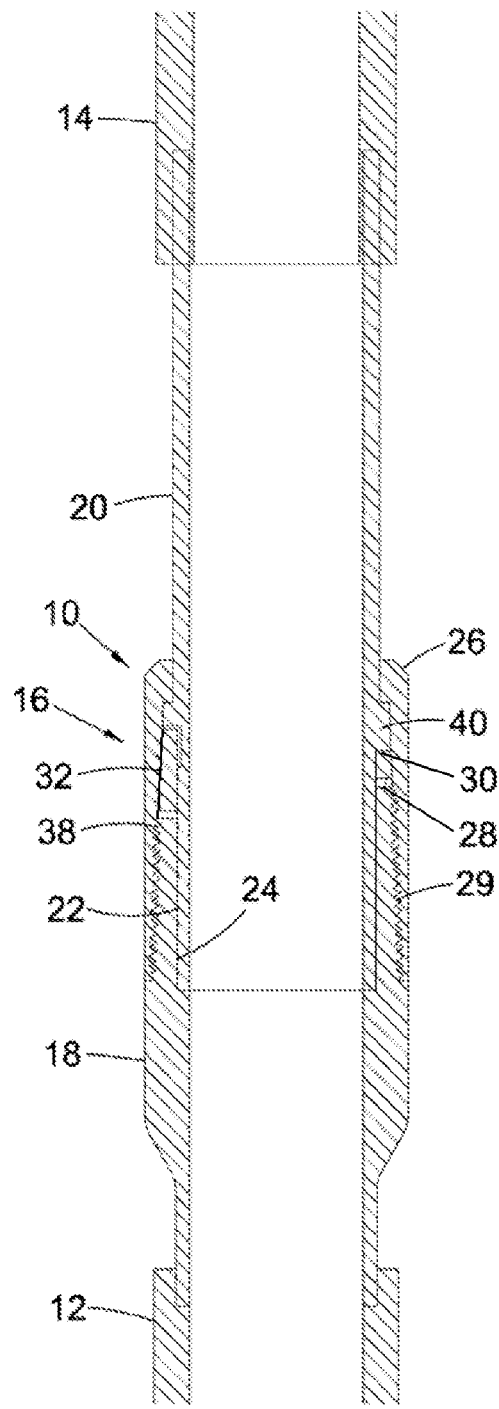
FIG. 1 is a section view of a tubing section coupling according to an embodiment of the present invention.

Referring now to the Figures, there is shown a number of views of a tubing section coupling, generally indicated by reference numeral 10 and parts of the coupling 10 according to an embodiment of the present invention. The coupling 10 is coupled a first tubular 12 and to a second tubular 14 to form a tubing section 16. The purpose of the coupling 10 is to couple the tubulars 12 and 14 together with minimal rotation of the tubulars 12,14 during coupling.

The coupling 10 comprises a first tubular portion 18 and a second tubular portion 20. As can be most clearly seen from FIG. 2, the second tubular portion 20 has a polished external surface 22 adapted to slidingly engage a polished internal surface 24, defined by the first tubular portion 18. The tubular portions 18,20 are axially restrained by means of a collar 26 associated with the second tubular portion 20 and releasably connected to the first tubular portion 18 by means of a threaded connection 29.

Figure 2:
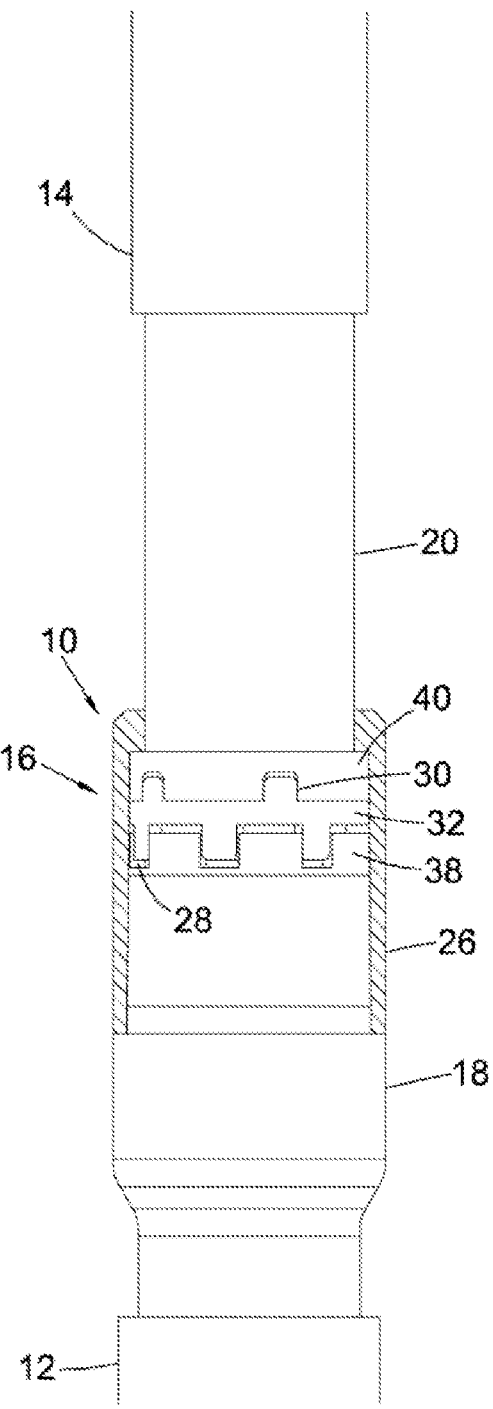
FIG. 2 is a partial section view of the tubing section coupling of FIG. 1.
Figure 3:
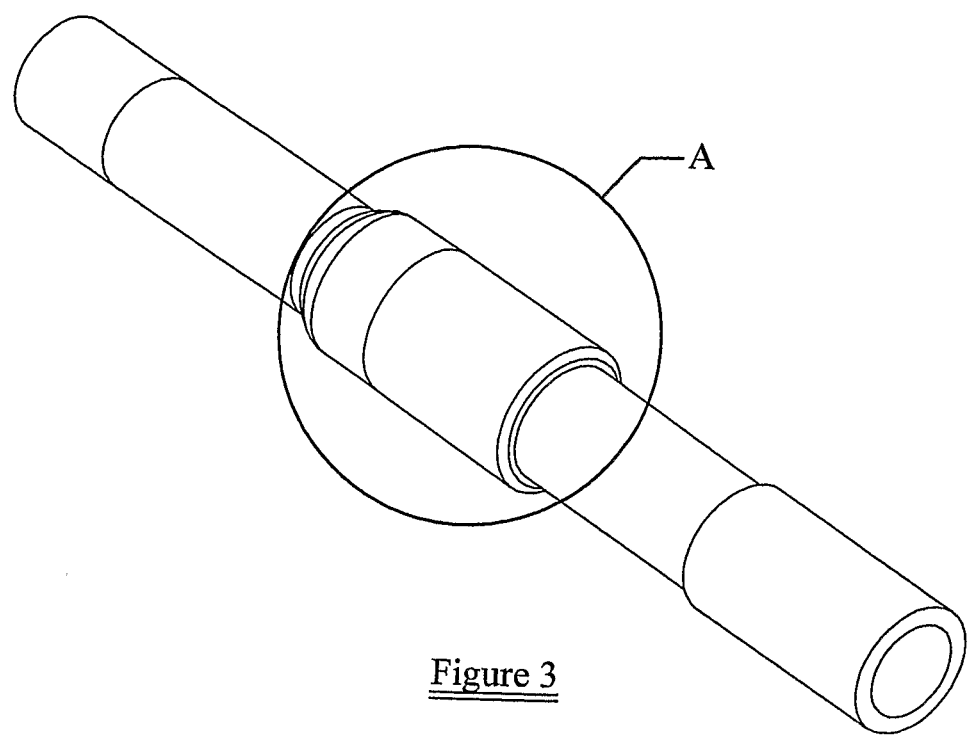
FIG. 3 is a perspective view of the tubing section coupling of FIG. 1.
Figure 4:
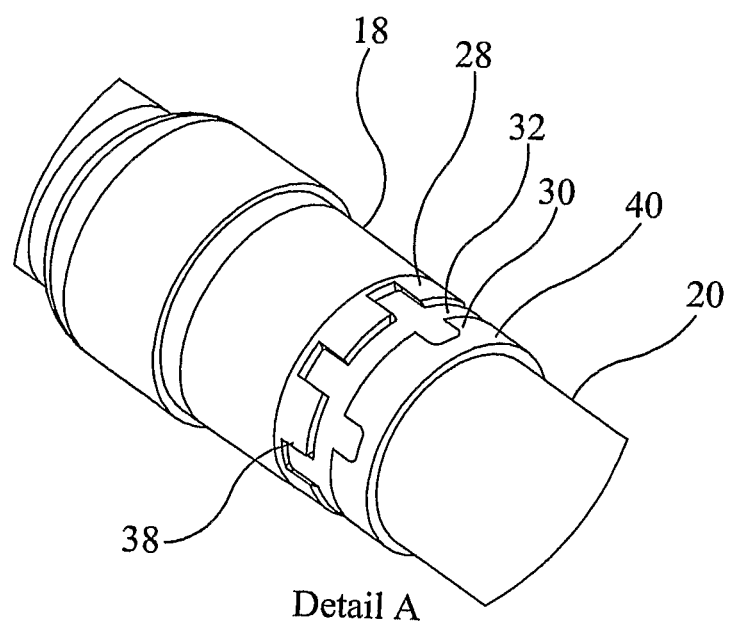
FIG. 4 is a close up of detail A of FIG. 3 with the collar removed.

Referring now to FIGS. 2 and 4, the first tubular portion 18 further defines a castellated profile 28. The second tubular portion 20 also defines a castellated profile 30, the castellated profiles 28,30 being connected by means of a metal connecting element 32 to rotationally restrain the tubular portions.

Figure 5:
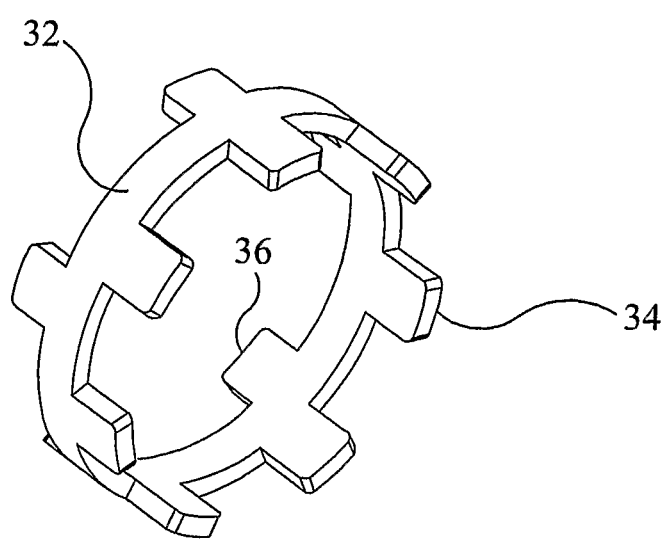
FIG. 5 is an enlarged perspective view of the connecting element of the coupling of FIG. 1.

Referring now to FIG. 5, the connecting element 32 comprises a first surface 34 defining seven castellations for engaging with the first tubular portion profile 28 and a second surface 36 defining five castellations for engaging the second tubular portion profile 30. The first and second connecting element surfaces 34,36 are designed to be complementary to their respective tubular portion profile 28,30 as can be seen from FIGS. 2 and 4. The reason the first and second tubular portion profiles 28,30 are different will be discussed in due course.

The first tubular profile 28 is defined by an end 38 of the first tubular portion 18 whereas the second tubular portion profile 30 is defined by a shoulder 40 extending radially outward from the second tubular portion 20 (FIGS. 1, 2 and 4). The shoulder 40 also prevents the collar 26 from sliding off the end of the second tubular portion 20.

The operation of the tubing section coupling 10 will now be described. The first tubular 12 and the first tubular portion 18 are torqued together and form the upper end of a tubing string 16. The connecting element 32 is then placed on the first tubular portion 18 in one of the seven possible orientations (related to the seven castellations of the first tubular portion profile 28). The preferred orientation is the one which most closely aligns the second connecting element surface 36 with the profile 30 of the second tubular portion 20. The second tubular portion 20 and the second tubular 14 (which are torqued together) are then lowered onto the connecting element 32 and, if necessary, rotated slightly until the second tubular portion profile 30 is aligned and engagable with the connecting element second surface 36.

The collar 26 is then rotated to make the threaded connection 29 with the first tubular portion 18. As the collar 26 cannot travel beyond the shoulder 40 the two tubular portions 18,20 pulled together into a tight engagement such that their respective polished surfaces 22,24 form a metal-to-metal seal. Once the threaded connection 29 has been fully made, the first tubular portion 18 is axially and rotationally restrained to the second tubular portion 20.

Various modifications and improvements will be made to the above described embodiment without departing from the scope of the invention. Although a connecting element is shown, the first tubular portion profile and the second tubular portion profile could be complementary and directly engagable without the need for a connecting element.

Additionally, although the profiles of the connecting element and the first and second tubular portions are shown as castellations, any suitable profile could be used which prevents the relative rotation of the first and second tubular portions once the coupling is made up.

The invention claimed is:

1. A tubing section coupling comprising:
a first tubular portion;
a second tubular portion having an external surface adapted to slidingly engage a internal surface defined by the first tubular portion, wherein the first and second tubular portions each define a profile, the profiles adapted to be indirectly connected to each other to rotationally restrain the tubular portions; and
a fixing device connected to the second tubular portion which releasably connects and axially restrains the first and second tubular portions together, the fixing device engaging a thread defined by an external surface of the first tubular portion and adapted to draw the tubular portions together to form a metal-to-metal seal between the engaged first and second tubular portions.

2. The tubing section coupling of claim 1, wherein the tubular portion profiles are castellations.

3. The tubing section coupling of claim 1, wherein the coupling is arranged such that only one of the tubular portions need be rotated to be coupled to the other tubular portion.

4. The tubing section coupling of claim 3, wherein the tubular portion to be rotated has a profile comprising fewer castellations than the profile of the other tubular portion.

5. The tubing section coupling of claim 1, wherein both tubular portions can be rotated.

6. The tubing section coupling of claim 1, wherein at least one of the first and second tubular portion profiles is defined by an external surface of the tubular portion.

7. The tubing section coupling of claim 1, wherein at least one of the first and second tubular portion profiles is defined by an internal surface of the tubular portion.

8. The tubing section coupling of claim 1, wherein the first tubular portion profile is defined by an end of the first tubular portion and the second tubular portion profile is defined by an external surface of the second tubular portion such that when the first and second tubular portions are fully engaged, the second tubular portion profile is adjacent the end of the first tubular portion.

9. The tubing section coupling of claim 1, wherein the fixing device is associated with one of the first and second tubular portions and adapted to be releasably connected to the other of the first and second tubular portions.

10. The tubing section coupling of claim 9, wherein the fixing device is releasably connected to the other of the first and second tubular portion by means of a threaded connection.

11. The tubing section coupling of claim 1, wherein the fixing device is a collar.

12. The tubing section coupling of claim 11, wherein the second tubular portion defines a radially extending shoulder for restricting axial movement of the collar in at least one direction.

13. The tubing section coupling of claim 12, wherein the shoulder further defines the second tubular portion profile.

14. The tubing section coupling of claim 1, wherein one or both of the tubular portions is releasably attachable to one or more tubulars.

15. The tubing section coupling of claim 1, wherein one or both tubular portions is integral with a tubular.

16. A method of coupling tubulars, the method comprising:
slidingly engaging an internal surface defined by a first tubular portion with an external surface defined by a second tubular portion;
rotationally restraining the first and second tubular portions by indirectly connecting a first tubular portion profile with a second tubular portion profile; and
axially restraining the first and second tubular portions together by releasably connecting a fixing device to the first and second tubular portions, the fixing device engaging a thread defined by an external surface of the first tubular portion and drawing the tubular portions together to form a metal-to-metal seal between the engaged first and second tubular portions.

17. The method of claim 16, wherein the rotationally restraining step further comprises rotating one or other of the first and second tubular portions to indirectly connect the first tubular portion profile with the second tubular portion profile.

18. The method of claim 16, wherein the method further includes the step of connecting the first tubular portion profile with the second tubular portion profile by a connecting element.

19. The method of claim 18, wherein the method further comprises the step of axially translating the fixing device with respect to one of the first and second tubular portions to releasably connect the collar to the other of the first and second tubular portions.

20. The method of claim 18, wherein the method further comprises the step of engaging a connecting element surface with one of the first or second tubular portion profiles before engaging the other of the first or second tubular portion profiles with another connecting element surface.

21. The tubing section coupling of claim 1, wherein the tubular portion profiles are indirectly connected through a connecting element.

22. The tubing section coupling of claim 21, wherein the connecting element comprises metal.

23. The tubing section coupling of claim 21, wherein the connecting element has a first surface complementary to the first tubular portion profile and a second surface complementing to the second tubular portion profile.

24. The tubing section coupling of claim 21, wherein the first and second tubular portion profiles are non-complementary.

25. The tubing section coupling of claim 1, wherein the first external surface and the first internal surface are tapered.

26. The tubing section coupling of claim 25, wherein the first external surface and the first internal surface are polished.

27. The tubing section coupling of claim 26, wherein the polished first external surface and polished first external surface form the metal-to-metal seal.

28. The tubing section coupling of claim 13, wherein the shoulder directly restricts axial movement of the collar in at least one direction.

29. The tubing section coupling of claim 11, wherein the second tubular portion is coupled to a second tubular, and axial movement of the collar is directly restricted by a shoulder of the second tubular portion in one direction, and the second tubular in an opposite direction.

* * * * *